United States Patent
Lawson

(10) Patent No.: US 7,255,017 B2
(45) Date of Patent: Aug. 14, 2007

(54) RUPTURE DISC MONITORING SYSTEM

(75) Inventor: Rick Lawson, Houston, TX (US)

(73) Assignee: FEDD Holdings, LLC, Houston, TX (US)

( * ) Notice: Subject to any disclaimer, the term of this patent is extended or adjusted under 35 U.S.C. 154(b) by 131 days.

(21) Appl. No.: 11/192,686

(22) Filed: Jul. 29, 2005

(65) Prior Publication Data

US 2006/0124299 A1   Jun. 15, 2006

Related U.S. Application Data

(60) Provisional application No. 60/591,976, filed on Jul. 29, 2004.

(51) Int. Cl.
  *G01M 19/00* (2006.01)
  *G01L 27/00* (2006.01)
(52) U.S. Cl. .................................. 73/865.8; 73/1.71
(58) Field of Classification Search ............... 73/1.71, 73/865.8; 137/68.28
  See application file for complete search history.

(56) References Cited

U.S. PATENT DOCUMENTS

| | | | |
|---|---|---|---|
| 4,046,280 A | 9/1977 | Hansen | 220/89 |
| 4,102,469 A | 7/1978 | Shegrud et al. | 220/89 |
| 4,119,236 A | 10/1978 | Shaw et al. | 220/89 |
| 4,129,759 A | 12/1978 | Hug | 200/83 |
| 4,232,698 A | 11/1980 | Hosterman et al. | 137/68 |
| 4,505,289 A | 3/1985 | Wilson | 137/68 |
| 4,580,691 A | 4/1986 | Hansen | 220/89 |
| 4,669,626 A | 6/1987 | Mozley | 220/89 |
| 4,759,460 A | 7/1988 | Mozley | 220/89 |
| RE34,308 E | 7/1993 | Thompson et al. | 340/679 |
| 6,006,938 A | 12/1999 | Mozley et al. | 220/89.2 |
| 6,240,948 B1* | 6/2001 | Hansen et al. | 137/68.28 |
| 6,241,113 B1 | 6/2001 | Mozley et al. | 220/89.1 |
| 6,431,383 B1 | 8/2002 | Mozley et al. | 220/89.1 |
| 7,051,570 B2* | 5/2006 | Brazier et al. | 73/1.71 |
| 7,168,333 B2* | 1/2007 | Brazier et al. | 73/865.8 |

* cited by examiner

*Primary Examiner*—Hezron Williams
*Assistant Examiner*—John Fitzgerald
(74) *Attorney, Agent, or Firm*—Baker Botts L.L.P.

(57) ABSTRACT

A rupture disc status monitoring system is provided for a manufacturing process. An embodiment of the system comprises at least one section of enclosure material having a flow path for a given substance upon rupture of a rupture disc associated with a vessel containing a given substance in a manufacturing process. The section may have an integrated hollow node or port extending from one wall of the section into the flow path. In the case of the node, the node may have walls of the same thickness as the wall of the section of the enclosure surrounding the flow path. The system may further provide at least one detector located in the node or port to detect a parameter associated with a rupture disc.

3 Claims, 1 Drawing Sheet

US 7,255,017 B2

RUPTURE DISC MONITORING SYSTEM

RELATED PATENT APPLICATION

This application claims priority to U.S. provisional patent application No. 60/591,976 filed on Jul. 29, 2004 entitled "Rupture Disc Monitoring System" which is herein incorporated by reference.

TECHNICAL FIELD OF THE DISCLOSURE

The disclosure relates to rupture disk monitoring systems.

SUMMARY OF THE DISCLOSURE

This disclosure, according to one embodiment, relates to rupture disc status monitoring systems for manufacturing processes, the systems comprising at least one section of enclosure material having a flow path for a given substance upon rupture of a rupture disc associated with a vessel containing a given substance in a manufacturing process. The section having an integrated hollow node or port extending from one wall of the section into said flow path, in the case of the node, said node having walls of the same thickness as the wall of the section of the enclosure surrounding the flow path. At least one detector/sensor and/or probe (which may all be battery powered) may be located in the node or port to detect a parameter associated with a rupture disc, e.g., an acoustic sensor or probe thereof in communication with said flow path.

The disclosure, according to another embodiment, relates to systems having a detector in electrical communication with a battery powered transmitter, the transmitter transmitting status signals relative to the status of the rupture disc, said status selected from the group consisting of rupture, leak, about to leak, and pressure building toward rupture or leakage.

DETAILED DESCRIPTION OF THE DISCLOSURE

Figure 1:
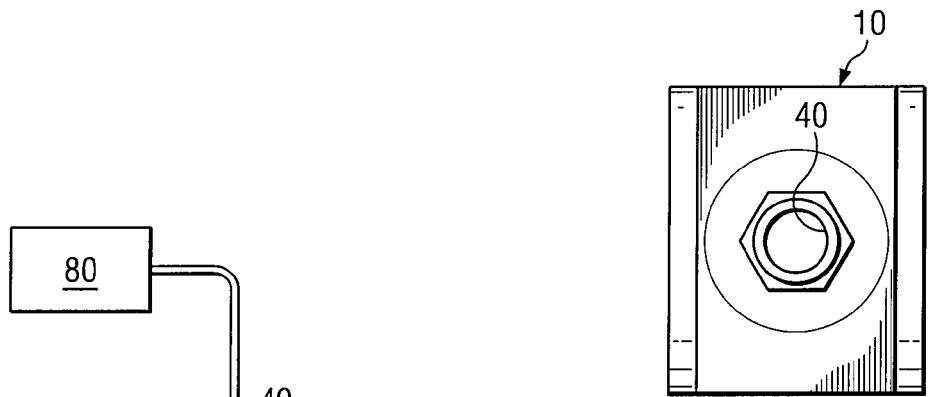
FIG. 1 shows a top view of an embodiment of the present inventive detector/sensor probe device/adapter (sensor not shown)
Figure 2:
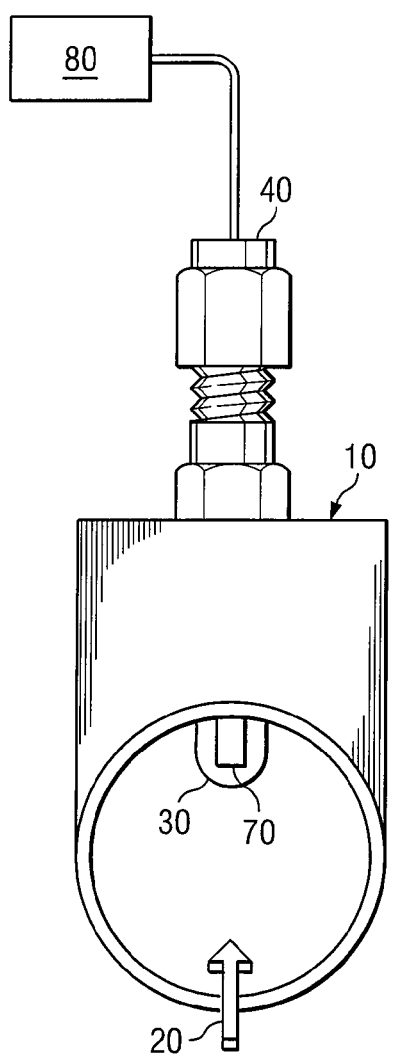
FIG. 2 shows a front view of an embodiment of the present inventive probe device/adapter (sensor not shown)
Figure 3:
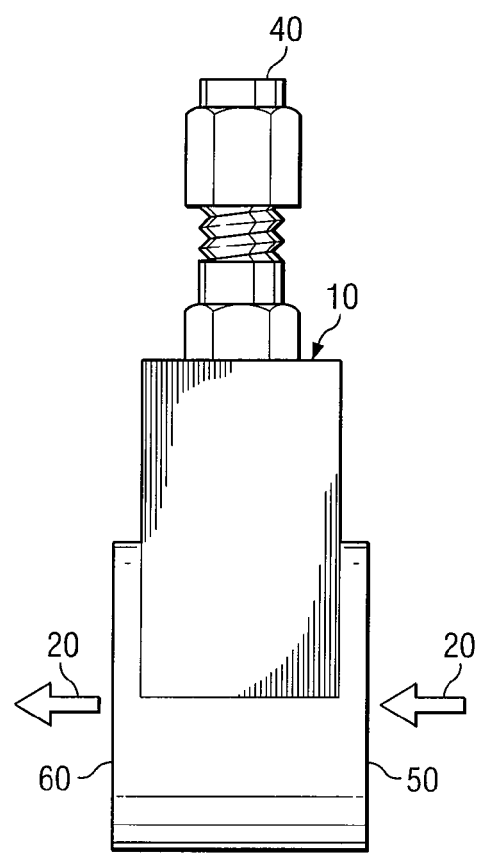
FIG. 3 shows a side view of an embodiment of the present inventive probe/adapter (sensor not shown).

The present disclosure, according to an embodiment, is directed to rupture disc monitoring systems and methods of monitoring rupture discs, e.g., to allow for preventive maintenance before a disc ruptures or alarm when a disc ruptures. Rupture discs are well known in the art and the present disclosure relates generally to all known rupture disc and pressure relief systems, e.g., the present disclosure is directed to, but not limited to, rupture discs as described in U.S. Pat. Nos. 6,431,383; 6,241,113; 6,006,938; 4,759,460; 4,669,626; 4,046,280; 4,119,236; 4,102,469; 4,505,289; and 4,580,691, which are expressly incorporated herein by reference. Furthermore, the present disclosure, according to some embodiments, may be used to improve known rupture disc monitoring systems including, but not limited to, systems as described in U.S. Pat. Nos. RE 34,308; 4,129,759; and 4,232,698 which are expressly incorporated herein by reference.

The present disclosure, according to an embodiment, is directed to an enclosure 10 integrated with a sensor/detector that may define a space wherein the status of a rupture disc or pressure relief device may be monitored. According to one embodiment, the present disclosure is directed to monitoring systems, e.g., like those described above with the addition of the present disclosure's transmission device and systems as described herein. According to another embodiment, the present disclosure is directed to systems comprising an enclosure or enclosures 10 to be fitted in close proximity to a rupture disc, for example, at the end of a pipe or the like. According to this embodiment, the present disclosure may comprise a fitting having two ends, e.g., first end 50 and second end 60. The first end 50 may be of approximately the same diameter and shape as the enclosure 10 to which the rupture disc is attached such that the first end 50 may be attached securely to said enclosure, e.g., in the case of a pipe, via threading or welding as is common in the art. Between the first end 50 and second end 60, the present disclosure may comprise a defined space, e.g., a length of pipe of the same diameter as the pipe to which the rupture disc is attached. In this section between the two ends, the section may comprise a node 30 which protrudes into the inside of the section. The second end may be enclosed. It may be enclosed if desired with any material to define a given space, e.g., controlled space between it and the rupture disc so that, e.g., a more accurate or reliable measurement of a parameter, for example, sound may be taken on a routine basis.

The present disclosure, according to an embodiment, may provide at least one section of an enclosure material, e.g., of pipe material (however, other enclosures and materials may be used as known in the art), having a path 20 therein associated with the path of the vessel to which the rupture disc is attached, which may, e.g., transport a given substance used during a manufacturing process. The at least one section may have an integrated node 30, e.g., node 30 is an integral part of the enclosure section, e.g. a small pipe section for insertion into the piping system of a manufacturing process wherein a rupture disc may be applied. However, in other embodiments, the at least one section may include a port 40 into which a sensor/detector 70 can be inserted for contact with a space following the rupture disc. The node 30 of the section of enclosure 10 material, or the detector/sensor 70, may extend, according to an embodiment of the disclosure, into a path 20 a given substance would travel if the rupture disc was to rupture or leak. According to an embodiment, the wall thickness of node 30 may be the same as the wall thickness of the enclosure 10 material section and of the enclosure material, e.g., a pipe, of the manufacturing process. The node 30 may be provided with a detector 70, preferably an acoustic sensor as is known in the art, to detect the status of the rupture disc, including status before rupture. Alternatively, the port 40 may be provided with a sensor 70, e.g., an acoustic sensor/probe, e.g., a battery powered sensor/probe, to monitor sounds associated with the rupture disc and the enclosed space. The second end 60 of the section of the defined space may be enclosed with a secondary rupture disc, e.g., of equal or lesser pressure containment capabilities than the primary rupture disc.

The detector/sensor 70 of the disclosure may report the status of a given parameter, e.g., relative sounds associated with the disc during the manufacturing process via hard-wire or telemetry. The detector/sensor 70 may report via a radio frequency transmitter 80 as is known in the art, e.g., via a known spread spectrum transmitter, e.g., 900 mega hertz or 2.4 giga hertz spread spectrum transmitter. However, any transmitter 80 may be utilized depending upon the application including, but not limited to gigahertz and megahertz transmitters, and particularly 900 megahertz spread spectrum radio frequency transmitters. Transmitter 80 may transmit an identification code in addition to the sensed status, e.g., sounds, to identify the location of the rupture disc reading. Transmitter 80 may report on a given predetermined time basis automatically, require polling, or transmit only when the parameter is outside a given range or close to being outside of a given desired range, or when a low battery power situation arises. In addition, transmitter 80 may be bidirectional, that is, receive and transmit signals. Also, some detectors/sensors 70 of the disclosure may report via hard-wire while other detectors/sensors may report via telemetry. The system may, besides fugitive emissions detectors, also include detectors 70 that detect vibration, pressure, level, flow and viscosity etc. The system may also include a receiving location (most often a remote location like a central control room for a given process or facility in the facility) for receipt of signals from the detectors 70, and other detectors if applicable, for reporting the sensed parameter relating to rupture disc status, e.g., a rupture, a leak, a disc is about to rupture, about to leak, or progressing toward a rupture etc. The system may include an alarm such that if a parameter, e.g., sound, is outside of a given range, an alarm is initiated or the process is automatically terminated for a time period until the given parameter is back within desired or designed specifications.

The section of enclosure material 10 may be manufactured from a single piece of material, for example, a block of material, which is machined to form the integrated node or port. The section of enclosure material 10 may also be manufactured using a casting process designed to form the enclosure section piece with the node or port. The detector 70 may be any type of sensor/detector, e.g., fugitive emissions detectors as known in the art including all known acoustic sensors. The section of enclosure material 10 may be incorporated into an existing section of enclosure, e.g. a pipe, via welding, clamping, threading connections known in the art.

The present disclosure is particularly applicable to the food and pharmaceutical processing/manufacturing industries (but however, is applicable to all industries), especially where a non-integrated intrusion, for example threaded intrusion, into the piping systems would provide disadvantages, including possible contamination, unwanted substance build-up inside the piping, and difficulties maintaining or calibrating the detector. The present disclosure, according to some embodiments, provides a sterile, safe, easily maintainable system for monitoring rupture discs and other parameters in a manufacturing process. For example, the detectors 70 may be replaced, calibrated or checked without intrusion into the piping system and without discontinuing the process, i.e., on the fly. And the utilization of transmitters 80 to transmit the data provides a quick and easy way to upgrade an existing system, i.e., no wires have to be run or connected throughout the plant to report the data to a control room etc.

I claim:

1. A rupture disc status monitoring system for a manufacturing process, said system comprising:
    at least one section of enclosure material having a flow path for a given substance upon rupture of a rupture disc associated with a vessel containing a given substance in a manufacturing process, said section having an integrated hollow node or port extending from one wall of the section into said flow path, in the case of the node, said node having walls of the same thickness as the wall of the section of the enclosure surrounding the flow path; and
    at least one detector located in the node or port to detect a parameter associated with a rupture disc.

2. The system according to claim 1, wherein the at least one detector is an acoustic sensor in communication with said flow path.

3. The system according to claim 1 wherein the detector is in electrical communication with a battery powered transmitter, said transmitter transmitting status signals relative to the status of the rupture disc, said status selected from the group consisting of rupture, leak, about to leak, and building pressure toward rupture or leakage.

* * * * *